July 30, 1929.  D. H. WEST  1,722,832
HYDRAULIC TRANSMISSION
Filed Dec. 10, 1927  4 Sheets-Sheet 1

Inventor
Donald H. West
by Mitchell, Chadwick & Kent
Attorneys

Fig. 3.

Inventor
Donald H. West
by Mitchel. Chadwick Kent
Attorneys

July 30, 1929.　　　D. H. WEST　　　1,722,832
HYDRAULIC TRANSMISSION
Filed Dec. 10, 1927　　　4 Sheets-Sheet 3

Inventor
Donald H. West
by Mitchell, Chadwick & Kent
Attorneys

July 30, 1929.　　　　D. H. WEST　　　　1,722,832
HYDRAULIC TRANSMISSION
Filed Dec. 10, 1927　　　　4 Sheets-Sheet 4

Inventor
Donald H. West
by Mitchell, Chadwick & Kent
Attorneys

Patented July 30, 1929.

1,722,832

UNITED STATES PATENT OFFICE.

DONALD H. WEST, OF NEW LONDON, CONNECTICUT.

HYDRAULIC TRANSMISSION.

Application filed December 10, 1927. Serial No. 239,165.

This invention relates to improvements in hydraulic transmissions. More particularly it relates to that type wherein a multiplicity of pistons, arranged around and parallel to an axis, co-act with the gyrations of a plate set obliquely across said axis, the pistons being connected to the gyrating plate so that the length of piston stroke is controlled by the degree to which the plate is tilted. Such devices may operate as pumps, or reversely as motors. Considered as variable delivery pumps, they are particularly useful for receiving mechanical power through a rotating shaft, and delivering hydraulic power, under high pressure, in which the rate of flow and direction of flow are under control and may easily be changed by tilting the plate to a different obliquity without changing the speed or direction of rotation of the driving shaft.

Hitherto pumps of said type have been extremely noisy due to the rapid fire of internal shocks, as the pistons successively meet and escape from the high pressure. This is disagreeable, is attended by undue wear, and also in some cases is seriously objectionable, as when it is desired to use the device in submarine service where quiet is a vital matter. And the incidental vibration has been more or less communicated to the driven mechanism, so that the operating of a machine tool thereby for precision work has been difficult.

Also there has been a tendency of the tilted plate to be unstable and to slip back from the working position in which it has been set, gradually reducing the piston stroke to zero. To avoid this it has heretofore been proposed to provide a positive lock; and this lock has made it more difficult to provide an automatic control to shift the plate, after a predetermined cycle of the driven mechanism, for example, to stop the power at end of stroke of a broaching machine; or to reverse the power as in a planer.

Also, in pumps as heretofore built, the high pressure thrust of pistons and of the working liquid has constituted a powerful divisive force tending to split the device open. Since the pistons rotate, while the resisting surfaces are stationary, a special problem exists; and in devices heretofore proposed this divisive force has been resisted only by arrangements which have involved high internal friction both of liquid and of machine.

The present invention introduces into such pumps the new technical effects of quiet; of stability and poise; and of cohesion. By the quiet, an approximate silence and steadiness in operation is attained; by the stability and poise of tilted plate (in whatever position it may be set) the need for a positive lock for this plate is eliminated, and yet the control to set and reset the plate can be operated by a simple direct thrust; and by the new arrangement of pump elements and construction of fluid passages, internal friction of the working liquid and friction of mechanism become reduced, resulting in increased efficiency.

Features of the invention by which these results are attained include the provision of ports in the rotor which extend radially inward from its cylinders to its cylindrical surface of cleavage from the stator. The stator fits closely within the axial bore of the rotor and contains the stationary intake and outgo chambers around which the rotor cylinders are revolving. As the side walls or lips of each port at the surface of cleavage are balanced (so that each port has equal surfaces exposed in opposite directions of axial thrust of the liquid within it), the high internal pressure of the working liquid does not have a divisive effect tending to separate the rotor from the stator.

The closure to prevent escape of liquid is by providing cylindrical surfaces between rotor and stator so close fitting that, while they do not touch each other, nevertheless the space between them is so slight, that practically no liquid escapes. This closure operates without appreciable wear of the said surfaces, for they are not in contact, and the accuracy of their setting is maintained by annular bearings. The making of the radial ports of full cylinder cross-section makes a minimum of change of pace of liquid particles, while flowing, and so reduces the internal friction of the liquid to a minimum. The pistons are reciprocated by a tilted driving or transmission plate which is in effect a rotating face on a tiltable cradle block, which plate is pierced by and rotates with that shaft, which shaft in turn is fast to the cylinders in which the pistons move. The pistons are connected to the plate by the usual piston rods; and this is old; but it is a feature of the invention that the piston rods are socketed in that plate on a circle whose radius slightly exceeds the radius of the circle of pistons; so that, when the plate is tilted to the position for maximum stroke, each piston rod becomes parallel to the axis when at its extreme travel of the stroke; although the rod is inclined slightly outward, from piston to socket, at all other positions of its stroke. The said driving plate gets its adjustment of obliquity by the tilting of its block. The latter can be turned, with a moderate degree of sliding friction, upon a cylindrical supporting bed of large diameter, for which a diameter approximately equal to that of the line of sockets has been found suitable.

This combination as a whole produces a condition of poise, such that the operating pressure of the pistons does not tend to displace the block, from whatever tilted setting it may have, and yet it is easy for the operator, or for an automatic push or pull mechanism, to slide the block around on its bed, when it is desired to make a further adjustment.

It is intended that the patent shall cover by suitable expression in the appended claims whatever features of patentable novelty exist in the invention disclosed.

The accompanying drawings illustrate an embodiment of the invention, which is chosen to be herein described for operation as a variable displacement pump. In the drawings.

Figure 1:
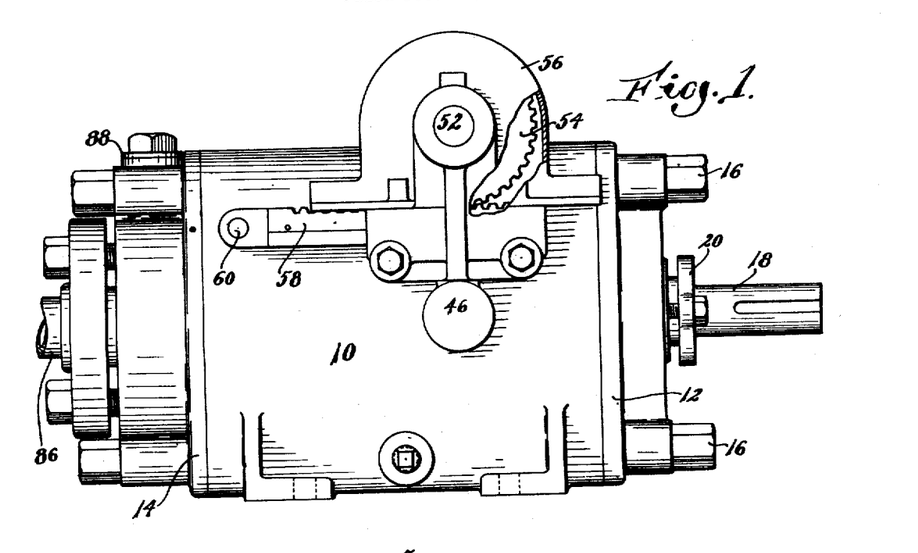
Figure 1 is a side elevation of such a pump.
Figure 2:
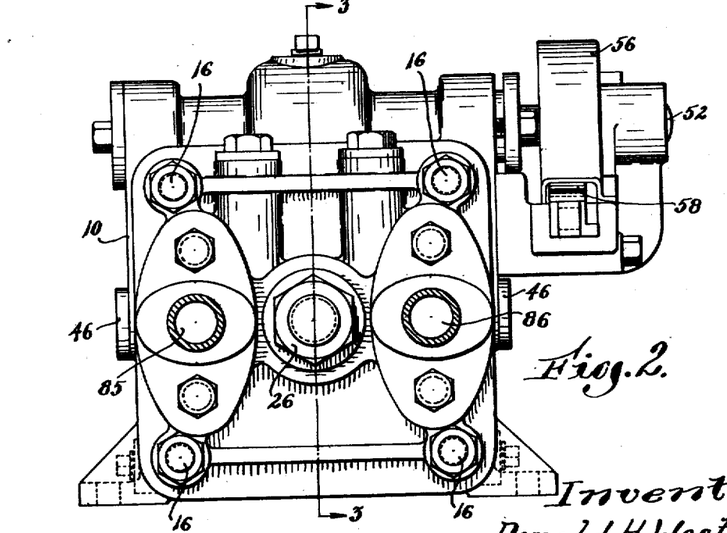
Figure 2 is an elevation of the end of the same which is toward the left in Figure 1.
Figure 3:
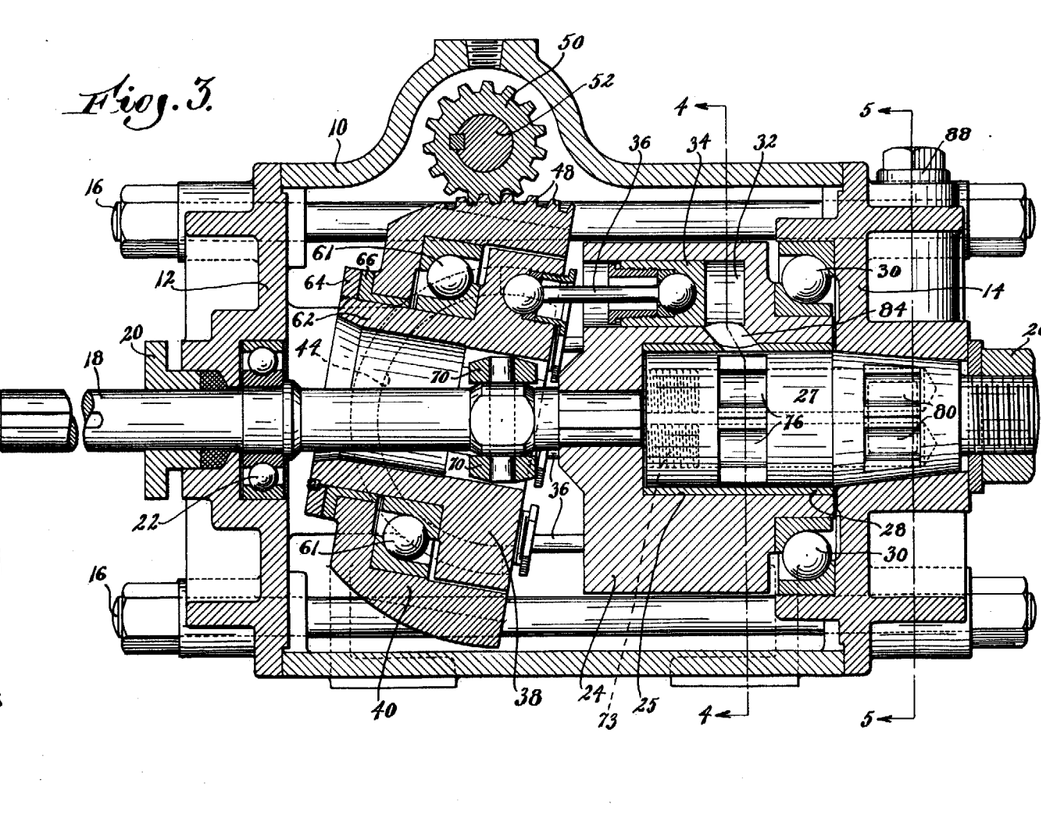
Figure 3 is a side elevation in medial section, as on 3—3 of Figure 2, viewed from the side opposite to that of Figure 1.

The drawings represent a device for transmitting power from a shaft 18, rotated by any suitable means (not shown), to a liquid, moving in a piping system (not shown) which includes the conduits 85, 86. When so operated the device constitutes a pump by which the liquid may be made to move in either direction through those conduits while the shaft continues to rotate in the same direction; and may be made to move at any graduation of velocity from zero up to a predetermined maximum, while the shaft rotates at constant speed; and may be moved at any pressure, up to the limit of strength and available power. While it is also true that the apparatus may be operated reversely converting movement of the flowing liquid into rotatory movement of the shaft, it will be sufficient for understanding the structure to speak of the device hereinafter only as a pump. The casing 10, which conveniently may be rectangular in cross-section as shown (Fig. 4), has end cover plates 12, 14 (Fig. 3) secured in place by tie-bolts 16 in a manner to make the casing liquid-tight. The drive shaft 18 extends axially into the casing through plate 12 at the driven end, with a packing nut 20 to prevent leakage, and ball-bearings 22. The inner end of shaft 18 is splined, with drive fit, into a rotor 24, containing the cylinders. This rotor surrounds the stator with very close running fit. It has an axial cylindrical bore 25 in which is a cylindrical stator 27, fixed on the end plate 14, and extending thence into the said bore. The nicety of fit of the stator in said bore prevents any liquid leakage of consequence along this cylindrical cleft between stator and rotor. The stator projects rigidly as a stud from the end plate 14 to which it is secured by nut 26. A large annular ball-bearing 30, carried by the same end plate, centres the rotor about the stator, and sustains the endwise thrust of the rotor. Designedly there will be no wear between rotor and stator, for the bearings 30 and 22 are to keep them perfectly centred and to prevent actual contact of rotor with stator, and so to prevent wear; but for precaution a bushing 28 is set between stator and rotor which readily may be replaced by a new one should appreciable wear occur.

A multiplicity of cylinders 32, seven being shown, are provided in the rotor 24, open toward the transmission plate 38, spaced apart equally around the axis of the rotor with their own axes parallel thereto. Each cylinder has a piston 34 operable in it, with piston rod 36 extending to a socket on the plate 38, which is a sort of rotatable face on the tiltable block or cradle 40. The cradle is bedded in yokes 44 which are surfaces of large radius of curvature about an axis transverse to the axis of the shaft. The cradle may be shifted thereon either to set the socket plate in a neutral plane, perpendicular to the shaft, or to tilt it to any angular position within its limits of travel. When the cradle is in neutral position the gyration of the plate produces no movement of the pistons 34; but when the plate is tilted its gyration about the axis of the shaft will reciprocate the pistons in their respective cylinders. A yoke-like support, or bed, comprising two large semi-cylindrical surfaces 44, one at each side, on the end cover plate 12, receives the semi-cylindrical bearing portions 42 of the cradle-block 40, for the tilting, with axis transverse to that of the drive shaft. Screws 46, threaded into the casing at each side, have trunnion ends fitting loosely into holes at the tilting axis of the cradle. But, when assembled and in operation, the whole support for the cradle is at the yoke 44, the trunnions 46 being merely convenient as retainers when it is loose. Concentric to its axis of tilting, the block 40 has gear teeth 48, in which pinion 50 meshes. This pinion is keyed on shaft 52 which projects transversely of the casing and carries a large gear 54, in housing 56, meshing with a slidable rack 58 which has a hole 60 for connection to linkage or other device (not shown). The latter may be the hand-operated or automatic stop mechanism of a machine which is being actuated by the liquid that is being pumped by the apparatus illustrated. Thus a movement of rack 52 may turn the cradle 40 on its semi-circular bearings; in which case the contacting surfaces at 42, 44, slide over each other with moderate friction.

The socket-ring 38 is a sort of surface plate which rests on an annular radial and thrust ball bearing 61 in the cup shaped cradle-block 40. It has a large tubular retaining stem 62, surrounding the shaft 18, and projecting through the middle of the bottom of the cup or block 40, and these carry the retaining nut 64. A bushing 66 may be inserted between the sleeve 62 and the cradle and nut, with running fit around the tube, which is centered on said annular radial and thrust ball bearing 61.

Figures 6, 7, 8:
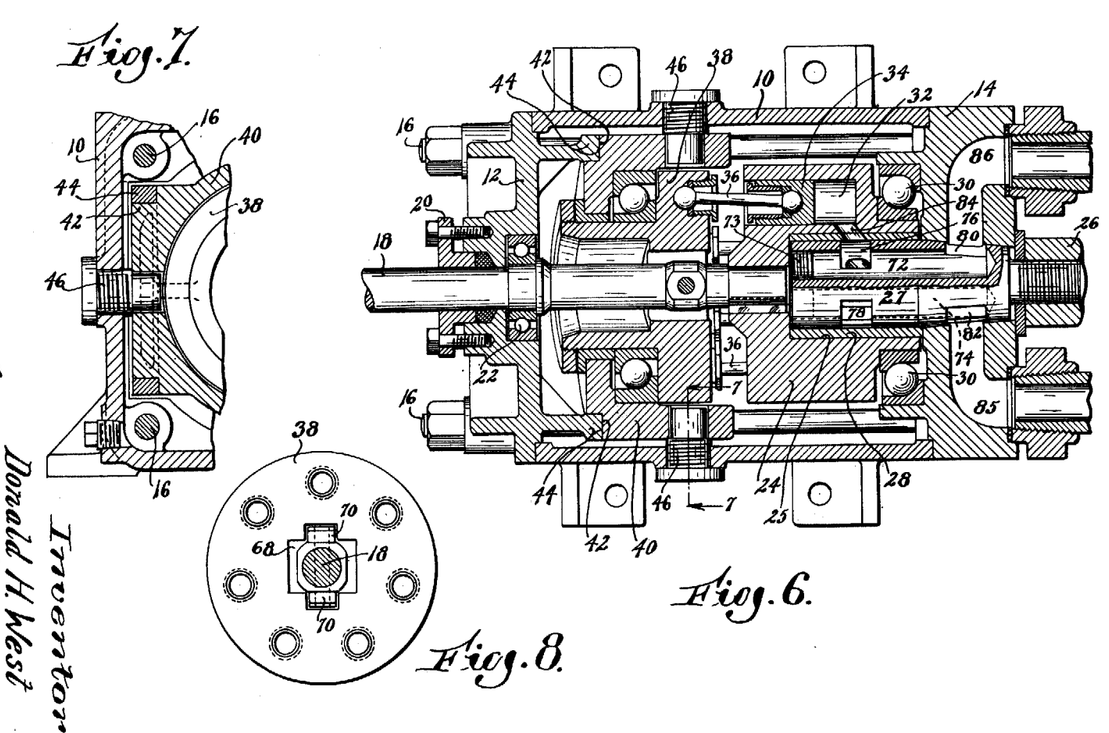
Figure 6 is a plan, in section on line 6—6 of Figure 4.
Figure 7 is an elevation, of a fragment, in section on 7—7 of Figure 6.
Figure 8 is an elevation of the socket-ring, showing its drive connection with the shaft.
Figure 9:
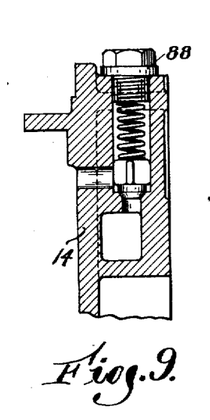
Figure 9 is a medial section through one of the relief valves.

The socket-plate 38 is rotated on this ball bearing by the drive shaft 18, at whatever angle it may have been set by the tilting of cradle 40. To this end the ring has an axial hole 68 (Fig. 8) in which are shoes 70 in the nature of keys pinned on the shaft 18 and fitting nicely in two opposite grooves of the cross-shaped hole 68. The keys 70, rotating in the plane perpendicular to the axis of the shaft, provide a positive drive for the socket-plate, which latter is thick enough for the shoes to be always in contact with it notwithstanding that the plate is set at an oblique angle.

Each piston rod has ball and socket connections at both ends; but the ring of sockets in the transmission plate is on a slightly larger radius than is the circle of piston ends. The difference need be but little but is such that when the socket-ring is in tilted position the piston which is at its inner end of stroke will have its piston-rod parallel to the shaft. It follows that when the ring is set perpendicular to the shaft, in neutral position, all transmission plate ends of piston rods are spread out a little more from the axis than are the pistons, and the rods are splayed out a little from parallelism with the shaft. Even when the ring is tilted each rod passes through a splayed position, as when its ring end passes the axis about which the ring is tilted, at midstroke. The showing of piston rod in Figure 6 may be considered to illustrate either of these cases, it being a section in the plane of the axis of tilting and showing a position which every piston rod must pass through during every revolution of the shaft, whether the ring be tilted or not. Assuming the drive shaft and the axis of tilting to be horizontal and the cradle to be tilted toward the pump at the top, all as illustrated, back pressure of liquid on those pistons which are on their compression strokes and are above the axis of tilting tends to turn the cradle to its neutral position; and on those below the axis of tilting tends to turn it in the opposite direction. This makes the resultant force be applied near the axis, at a point which fluctuates with the change of position of the pistons as they revolve, about the main axis. The turning moment exerted by each piston tending to disturb the tilted position of the block 40 is a complex function, because while the leverage arm of the moment of the force is greatest when the piston is in position corresponding to the top or to the bottom of travel of its ring socket, the direction in which that socket is constrained to travel, at top and at bottom, is so nearly in the direction of the axis of tilting that the resultant direction of propulsion along the main axis, which is a component in the net tilting effect, is near zero. And when rising past the axis of tilting (at the position of the rod seen in Figure 6), where said propulsion is greatest, the tilting leverage is passing through zero. And in intermediate position the resultant of the forces applied to the plate by the pistons is in a position which is ever changing as the rotation of pistons about the main axis progresses. In their tilting effect upon the plate and block, the three or four pistons which are simultaneously in compression stroke neutralize each other to a great extent; and the same is true on the suction side. But the pressure of all of these pistons has to be borne on the bearing and is in total a very considerable force; and this force has a critical effect, explained hereafter, which is utilized by the invention in producing a condition of self-poise of the tilted control plate, such that this plate on the one hand tends to remain at whatever degree of tiltage it is set, but on the other hand it is so lightly poised that it can be moved to a different degree of tilting with moderate effort. The structural relations which are illustrated for producing this result show the bearing surface 44 with a radius of curvature (dotted line in Figure 3) about equal to that of the circle of pistons, and of piston rod sockets on the transmission plate. In the drawings the circle of sockets is slightly larger than the circle of pistons, so that when the cradle is tilted so as to produce maximum stroke of the pistons the line of each piston rod becomes parallel to the main shaft 18 at each end of the stroke, in which case it is about tangent to said bearing surface 44. It has been found that under these circumstances it will remain still, in a condition of stability, while the machine is operating, and yet can be moved to a different setting by the exertion of only moderate effort. But the tilted plate would be unstable, and would gradually work back to a neutral position of perpendicularity to the shaft, if the radius of the bearing surface 44 were considerably reduced, for example, to the size of the trunnions 46, which approximate in size bearing surfaces hitherto used by others for this function; and on the other hand the effort required to change the setting would become seriously difficult if the radius of the bearing surface 44 were made very considerably larger than that illustrated.

An explanation for this is found by considering that the curvature of the bearing surface is arranged in critical relation to the resultant force which the piston pressures apply to the tilted plate. This resultant force passes through a cycle of changes of positions during the movement of each piston from any certain position to the simultaneous position of the next piston. Its fluctuation of position during the cycle takes it through a position in which the said resultant force may be considered represented by a line passing the axis of tilting a short distance from it, which therefore constitutes a moment tending to turn the block on its axis of tilting. This turning moment is resisted by the friction between surfaces 42, 44, plus that which exists elsewhere in the control system of the tilting. In the particular apparatus which is being described the bearing surfaces 42, 44, are of semi-steel and are directly in contact with each other, with a film of oil intervening, which works its way in because the whole case 10 is filled with oil. The friction between them therefore is not great, but it is sufficient so that if the bearing surfaces 42, 44 were curved on a large radius (for example, twice that which is illustrated herein) the line of the force constituting the turning moment would be proportionately so near the axis, and so nearly perpendicular to the direction of the particular part of the curved bearing surface on which it would be incident, that it would be in effect applied to the tilting block practically "on dead centre." So long as this resultant force does not fall outside of the angle of friction between the surfaces, the motion of one surface over the other is inhibited by the friction, no matter how great the said resultant force may be; and for this purpose the other friction in the control system may be considered added to the actual friction at the point of incidence of the force. But if the radius of curvature of the bearing surfaces 42, 44 were very small the said resultant force, passing at the same said distance from the axis, would be proportionately far enough from the axis to strike the bearing surfaces outside of the angle of friction, and therefore to move one surface over the other; and the tilted plate would gradually work back to neutral position. It is a feature of the invention to arrange the parts so that the point of application of the resultant is at a place within the angle of friction, as it were, yet so near to the limit thereof that only a small rotatory force is required in addition, to effect a turning. I believe that it is because the second of these conditions has prevailed (resultant falling outside of friction control) without its nature or presence being known or recognized, that heretofore it has been necessary to provide a worm or other irreversible control, or a lock, for positively holding the tilted cradle in any set position. By eliminating the need for this, without going to the extreme of making the curved bearing surfaces too large, the present invention makes it possible to dispense with the lock or worm heretofore requisite, and to make the connections for automatic control of simple straight line action, such as a short-throw rack, herein illustrated, the plate being self-poised.

In operation, the drive shaft 18 may be rotating at constant speed but there will be no pump action so long as the transmission plate 38 is in neutral position. To start the pump, the rack 58 will be moved according to the direction of flow desired for the fluid. This simple and straight movement of the rack will rock cradle 40 to a tilted position which will result in movement of the pistons 34 in their cylinders with a length of stroke depending on the degree of tilting.

In the instance which is being described, the proportions which are illustrated produce the desired stability. In designing other apparatus embodying the same principles, as it is impracticable to measure the friction, and to determine actual fluctuations of the resultant piston force, it is advisable to determine the proper curvature for the bearing surfaces 42, 44 by experiment. Such a properly designed bearing for the cradle, the slight incline of the piston rods, the equal spacing of the pistons and the reduction of vibration next to be described all combine in the attainment of the said stability whereby the plate may be said to be self-poised.

Figure 4:
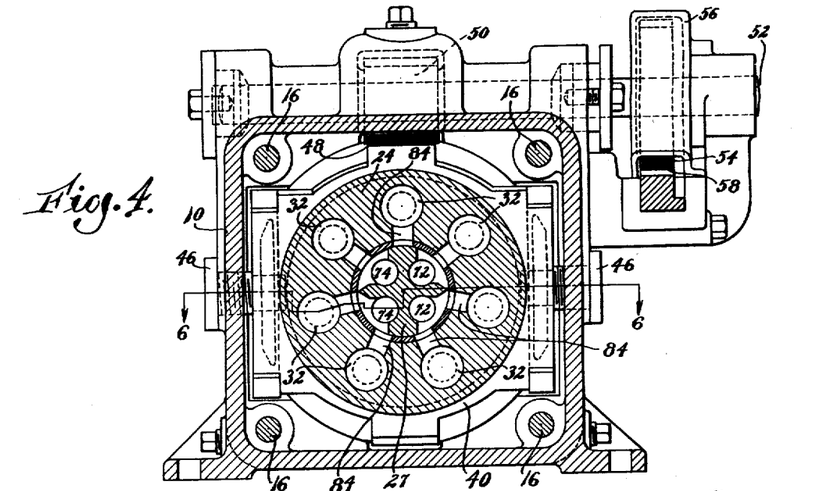
Figure 4 is an elevation, a transverse section on 4—4 of Figure 3.
Figure 5:
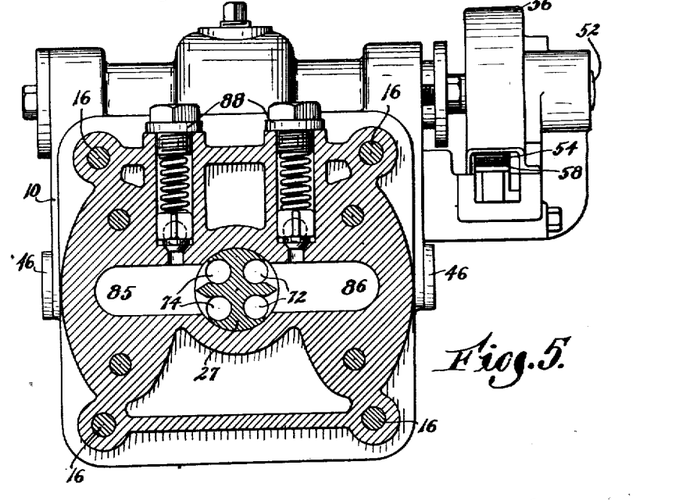
Figure 5 is an elevation, a transverse section on 5—5 of Figure 3.

The stator 27 fixed on end plate 14, has longitudinal passages 72, 74 (either of which may be for entrance and the other for discharge of liquid) on opposite sides of its central barrier seen in Figure 4. This barrier is perpendicular to the axis of tilting of the piston-stroke-control cradle 40, and it registers with the cylinder ports 84 when their pistons respectively are at end of stroke. The said passages 72, 74, are conveniently made as holes drilled longitudinally in the stator, with their entrance ends later plugged as at 73; and they are provided with side openings 76, 78, one at each side of the barrier, one of them to register with all cylinders 32 which are at any instant undergoing compression stroke, and the other to register with all that are at the same instant on suction stroke. They have similar openings 80, 82 making fixed connections for external intake and outgo. In the rotor, full-area ports 84 extend radially from the cylinders 32. With socket-ring tilted, the pistons on one side of the vertical barrier will be compressing liquid into one side opening of the stator, and the pistons on the opposite side of the said vertical barrier will be drawing liquid from the stator through the opposite side opening. If the socket-ring be tilted to the other side of its neutral, the action above described will be reversed.

Short circuiting of liquid is prevented by the closeness with which the convex cylindrical surface of the stator approaches the concave cylindrical surface of the rotor. By careful machining in manufacture and by mounting with extremely small clearance I have discovered that a relation exists between the skin tension of oil, as ordinarily used for hydraulic power, and the intensity of pressure ordinarily used, such that even the high pressures at which variable delivery pumps usually operate are not sufficient to break down the oil mechanically into a film thin enough to be forced through so narrow a passage, in quantities of any consequence. It is found practicable to construct the central stator 27 and the rotor 24 which surrounds it with a loose running fit having a tolerance of about .001 inch clearance per inch in the diameter. With a stator having a diameter of approximately 2.75 inches, the clearance between adjacent surfaces can be specified to be only one and one-fourth thousandths of an inch; and under these circumstances it has been found that the leakage of oil used for the working liquid does not exceed one-fifth of one per cent even while working under maximum pressure.

The continuance of these conditions, without the said clearance being increased by the stator becoming eccentric within the rotor, or without the occurrence of wear which would increase the clearance is effected by the mounting of the rotor upon a ball radial bearing 30 centred with precision about the same axis. In the case of wear occurring owing to mal-adjustment of this bearing the effect can be remedied by the substitution of a fresh bushing 28. Preferably this ball bearing is also a thrust bearing. This style of bearing, which does not in itself have the characteristic of being liquid tight, becomes possible by the provision of a central intake and discharge for the cylinders as they revolve, with a cylindrical cleavage having freedom from packing and from friction at this cleavage where leakage might occur. And because the unbalanced pressure at the cleavage between stationary and moving surfaces is all radial, it does not tend to produce in axial direction any stresses such as have in previous apparatus been kept in control only by limiting the area of discharge port to only a portion of the cylinder end, entailing severe change of pace and internal friction of the liquid. The ports may be of full size for uniform flow of liquid and the cylinders can thus be fully protected by relief valves 88 placed in the exterior passages. The shock as between the piston and the liquid is freely cushioned by the whole liquid system, including the small amount of air which is usually found entrapped therein. This also relieves the tilting block from disturbance by repeated shocks, so that the pump has a notable silence, steadiness and stability of control of operation.

I claim as my invention:

1. A hydraulic transmission comprising, in combination, a shaft with rotor having cylinders with pistons working therein, and piston rods; a transmission plate set obliquely across the shaft, rotating with the shaft but in its own plane and having joints to the piston rods arranged in a circle upon the plate; an adjustable cradle block on which the plate is mounted to rotate, and by which the plane of said plate is fixed; and a support for the said block having a surface of contact with the block, on which surface the block is movable for said adjustment to set the obliquity of the plate, and which surface is curved about an axis transverse to the shaft, on a radius approximating the radius of the said circle of rod joints.

2. A hydraulic transmission comprising, in combination, a shaft with rotor having cylinders with pistons working therein set around and parallel to the shaft; a transmission plate set obliquely across the shaft, rotating with it and having a circle of joints on a slightly larger radius than the radius of the said pistons from said shaft; rods extending from the joints to the pistons; and a cradle, on which said plate is mounted and rotates; said cradle being mounted for adjustment about an axis transverse to the shaft, with bearing, on its mount, approximating in radius the radius of said circle of joints on the plate.

3. A hydraulic transmission comprising, in combination, a shaft with rotor having cylinders with pistons working therein, set in a circle around the shaft; and a transmission plate set obliquely across the shaft, rotating with it, and having connections to the pistons; said connections comprising piston rods with joints on the plate arranged on a circle of slightly greater radius than the radius of said circle of pistons; and said plate being mounted adjustably, as to its obliquity, on an axis transverse to the shaft, having a bearing for said adjustment approximating in radius the said radius of the circle of pistons whereby the ordinary forces during operation, acting for and against a change of obliquity of the plate, are distributed and applied approximately in mutual balance.

4. A hydraulic transmission comprising, in combination, a shaft with rotor having cylinders with pistons working therein, set in a circle around the shaft; and a transmission plate set obliquely across the shaft, rotating with it, and having connections to the pistons; said connections comprising piston rods with joints on the plate arranged on a circle of slightly greater radius than the radius of said circle of pistons, and said plate being mounted adjustably as to its obliquity, on an axis transverse to the shaft, with frictional bearing restraining its movement, approximating in radius of the circle of pistons, whereby the ordinary piston forces, during operation, acting to change the obliquity of the plate are balanced by other ordinary forces, and thus the plate maintained in a state of stability in all positions of its adjustment.

5. A hydraulic transmission comprising, in combination, a shaft with rotor having cylinders with pistons working therein, and piston rods; a transmission plate set across the shaft, rotating with the shaft but in its own plane, and having joints to the piston rods arranged in a circle upon the plate; an adjustable cradle block supporting said plate rotatably within it; and means whereby the plate is self adjusting therein for assembly with piston rods and for wear; said means comprising a guiding sleeve on the plate extending slidably through a wall of said block, with retaining means arranged on the sleeve beyond said wall so as to permit small movement of the plate axially within the block; and there being a ring rolling thrust and radial bearing between the plate and block.

6. A hydraulic transmission comprising, in combination, a stator with peripheral ports and interior passages, severally for inflow and outflow; a rotor with cylinders arranged around the stator, each cylinder having a port opening toward the rotor's axis; pistons in the cylinders; and means for operating them; said cylinder ports being arranged and adapted to register with said stator ports alternately; and the lips of each cylinder port, which lie in the directions of axial thrust, being at equal radial distances from the axis of the rotor, whereby, as between the rotor and the stationary parts, the thrust of fluid contents tending to displace the rotor in either axial direction is balanced.

7. A hydraulic transmission comprising, in combination, a stator with peripheral ports and interior passages, severally for inflow and outflow; a rotor with cylinders arranged around the stator, each cylinder having a port opening toward the rotor's axis; pistons in the cylinders; and means for operating them; said cylinder ports being arranged and adapted to register with said stator ports alternately; and each cylinder port having an area large enough to be at least approximately equal to the area of its piston, whereby easy and silent liquid flow to and from the said stator passages is effected.

8. A hydraulic transmission comprising, in combination, a stator with peripheral ports and interior passages for inflow and outflow; a rotor having cylinders arranged around the stator with ports opening toward the common axis of stator and rotor and adapted to register with said stator ports alternately; pistons in the cylinders; and means for operating them; said rotor having an axial bore to which its ports lead; and said stator standing, with a substantially fluid tight, close running fit, within the bore.

9. A hydraulic transmission comprising, in combination, a stator with peripheral ports and interior passages for inflow and outflow; a rotor having cylinders arranged around the stator, with ports opening toward the common axis of stator and rotor and adapted to register with said stator ports alternately; pistons in the cylinders; and means for operating them; said rotor having an axial bore, and said stator standing with a substantially fluid tight, close running fit within said bore; and said rotor being mounted on annular rolling bearings remote in axial direction from the stator, whereby the said close running fit between rotor and stator is preserved against wear.

10. A hydraulic transmission comprising, in combination, a stator with peripheral ports and interior passages for inflow and outflow; a rotor having cylinders arranged around the stator, with ports opening toward the common axis of stator and rotor and adapted to register with said stator ports alternately; pistons in the cylinders; and means for operating them; said rotor having an axial bore and said stator standing, with a substantially fluid tight, close running fit within said bore; and there being an end plate on which is fixed the stator, and, also fixed thereon, an annular radial and thrust rolling bearing, for the part of the rotor surrounding the stator.

11. A hydraulic transmission comprising, in combination, a rotor having cylinders with pistons working therein, and having an axial bore; a stator, having inflow and outflow passages, standing, with a substantially fluid tight, close running fit, in said bore; and means to preserve said close running fit against being destroyed by wear, comprising radial bearings at each end of the rotor which support it wholly, said bearings and the stator being arranged all on the same axis.

12. A hydraulic transmission comprising, in combination, a shaft with rotor having cylinders and pistons working therein set on a circle around the shaft; a transmission plate set obliquely across the shaft and rotating with it; rods extending from the plate to the pistons; a cradle, normally stationary and capable of being set oblique to the shaft, on which cradle said plate is mounted and rotates; supporting means for mounting said cradle adjustably as to its obliquity, comprising two arcuate frictional bearings, on the ends of the axis of the cradle, separated from each other and arranged to extend at least as far apart from each other as said circle of pistons extends, each said bearing surface being curved on a radius approximating the radius of said circle of pistons; and means for adjusting said cradle in said bearings to change the obliquity of said plate, whereby said cradle is maintained stable in all positions of its adjustments, and yet is adapted to be moved for adjustment by a relatively small force applied through said adjusting means.

Signed at New London, Connecticut, this eighth day of November, 1927.

DONALD H. WEST.

CERTIFICATE OF CORRECTION.

Patent No. 1,722,832.  Granted July 30, 1929, to

DONALD H. WEST.

It is hereby certified that error appears in the printed specification of the above numbered patent requiring correction as follows: Page 6, line 17, claim 4, after the word "radius" insert the words "the said radius"; and that the said Letters Patent should be read with this correction therein that the same may conform to the record of the case in the Patent Office.

Signed and sealed this 15th day of October, A. D. 1929.

M. J. Moore,
Acting Commissioner of Patents.

(Seal)

pistons; a cradle, normally stationary and capable of being set oblique to the shaft, on which cradle said plate is mounted and rotates; supporting means for mounting said cradle adjustably as to its obliquity, comprising two arcuate frictional bearings, on the ends of the axis of the cradle, separated from each other and arranged to extend at least as far apart from each other as said circle of pistons extends, each said bearing surface being curved on a radius approximating the radius of said circle of pistons; and means for adjusting said cradle in said bearings to change the obliquity of said plate, whereby said cradle is maintained stable in all positions of its adjustments, and yet is adapted to be moved for adjustment by a relatively small force applied through said adjusting means.

Signed at New London, Connecticut, this eighth day of November, 1927.

DONALD H. WEST.

CERTIFICATE OF CORRECTION.

Patent No. 1,722,832.     Granted July 30, 1929, to

DONALD H. WEST.

It is hereby certified that error appears in the printed specification of the above numbered patent requiring correction as follows: Page 6, line 17, claim 4, after the word "radius" insert the words "the said radius"; and that the said Letters Patent should be read with this correction therein that the same may conform to the record of the case in the Patent Office.

Signed and sealed this 15th day of October, A. D. 1929.

M. J. Moore,
Acting Commissioner of Patents.

(Seal)